Sept. 13, 1960 M. D. SIPALA 2,952,232
FEED MECHANISM FOR FUSIBLE METAL STRIP APPARATUS
Filed Oct. 14, 1957 2 Sheets-Sheet 1
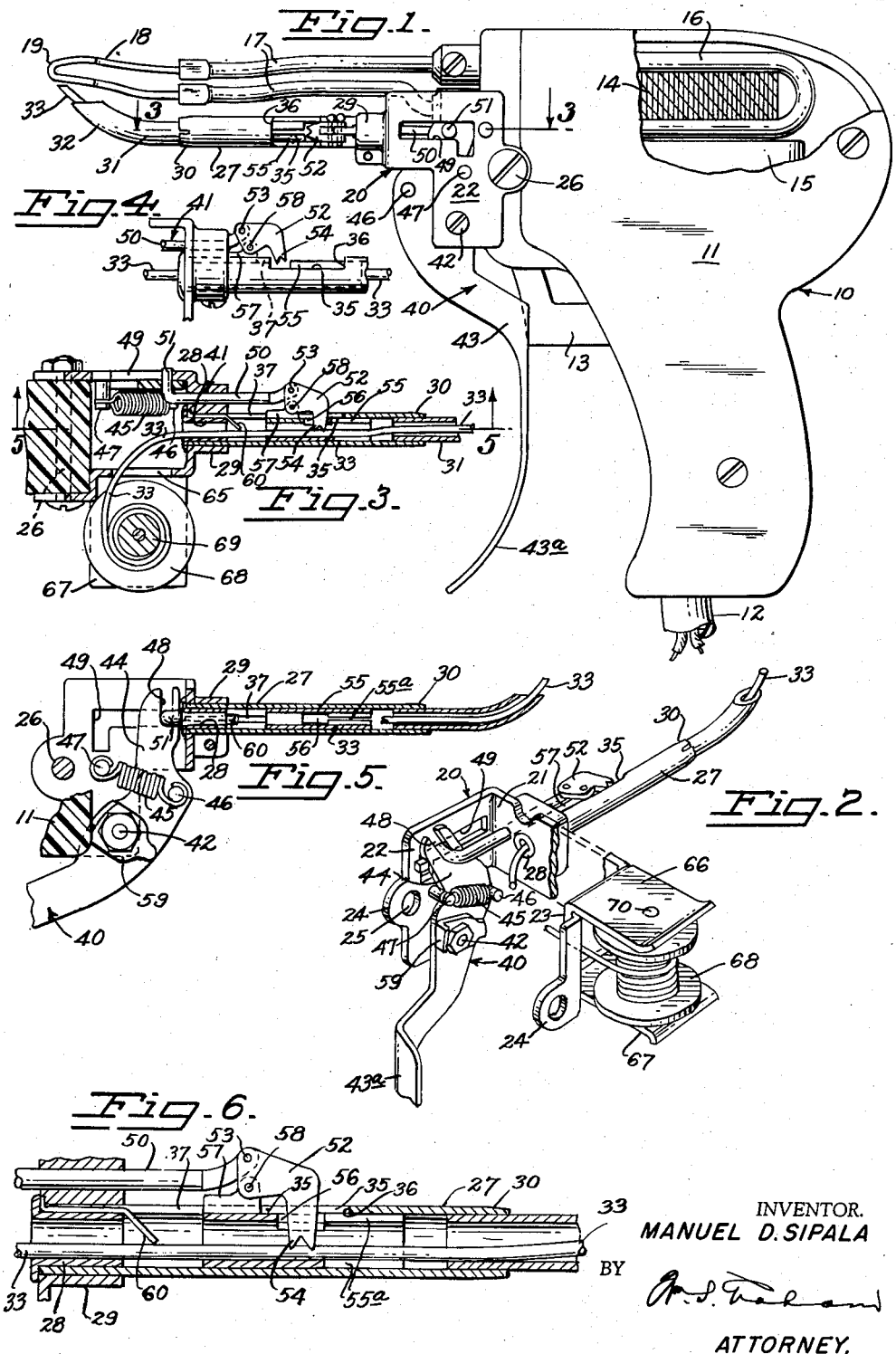
INVENTOR.
MANUEL D. SIPALA
BY
ATTORNEY.

Sept. 13, 1960 M. D. SIPALA 2,952,232
FEED MECHANISM FOR FUSIBLE METAL STRIP APPARATUS
Filed Oct. 14, 1957 2 Sheets-Sheet 2
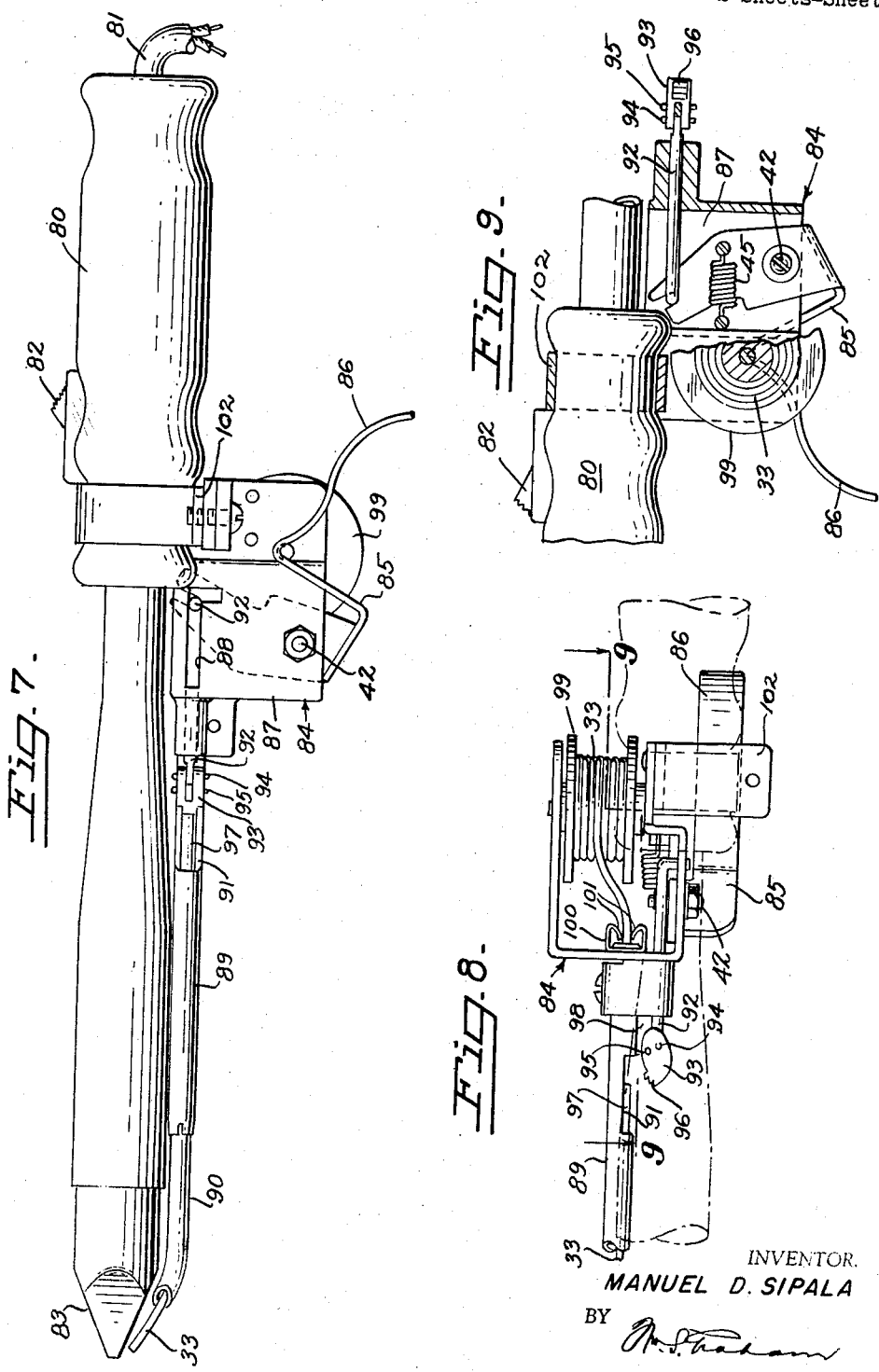
INVENTOR.
MANUEL D. SIPALA
BY
ATTORNEY

United States Patent Office 2,952,232
Patented Sept. 13, 1960

2,952,232

FEED MECHANISM FOR FUSIBLE METAL STRIP APPARATUS

Manuel D. Sipala, 1990 12th Ave., San Francisco 16, Calif.

Filed Oct. 14, 1957, Ser. No. 690,115

7 Claims. (Cl. 113—109)

This invention relates to feed mechanism for fusible strip metal devices such as in devices for soldering, brazing, welding and the like. It more particularly relates to means for step-by-step feeding of a wire or strip of fluxible or fusible metal from a magazine supply to the heating element of the operated apparatus, which would normally be a forward heated point of the apparatus, such as a soldering gun or soldering iron.

The employment of the invention finds one advantageous adaptation and use in soldering operations and is therefore exemplified herein in relation to such an apparatus, without limitation to its employment in related types of devices.

Since it is desirable in many instances to manually operate such apparatus by use of a single hand and leave the other hand of the operator free for holding a workpiece or other manipulation, it is an object of the present invention to provide a feed device for a metal fluxing apparatus which may be operated by single hand operation for step-by-step feeding of a fusible metal strip to the heated point of the apparatus, and to provide a feed means in which a fluxible metal strip is delivered to the heating point of a relatively long and narrow heating element of such apparatus.

Briefly described, the invention comprises a feed means for a fluxible metal strip which may be mounted on a hand-operated fusing device which has a heating point or tip remote from a handgrip, the feed means comprising a feed tube for guiding a wire or strip of fusible metal from a reservoir supply to a point adjacent to the heating element of the fusing device, and means for feeding the wire or strip in step-by-step progression through said feed tube responsive to a finger manipulated trigger lever adjacent to the hand-grip of the fusing apparatus. The feed means of the invention may be incorporated into the structure of the fusing apparatus, or may be mounted thereon by means of a supporting bracket upon which the feed means is mounted as a unitary assembly.

Preferred forms in which the invention may be embodied are described herein and are illustrated in the accompanying drawing in which:

Fig. 1 is a longitudinal side elevational view of a soldering gun incorporating the feed means of the invention.

Fig. 2 is a perspective view of the feed mechanism from the reverse side of Fig. 1, a portion being broken away and projected laterally to show structure.

Fig. 3 is a fragmentary laterally transverse sectional view on line 3—3 of Fig. 1.

Fig. 4 is a fragmentary plan view of a portion of mechanism shown in Fig. 3, at a varied position of operation as compared with Fig. 3.

Fig. 5 is a fragmentary longitudinal vertical section on line 5—5 of Fig. 3.

Fig. 6 is a fragmentary enlarged longitudinal sectional view of a portion of mechanism shown in Fig. 3.

Fig. 7 is a side elevation of a modified form of the feed mechanism of the invention adapted to a conventional aligned soldering iron.

Fig. 8 is a fragmentary plan view of feed mechanism shown in Fig. 7.

Fig. 9 is a fragmentary side elevation of a portion of feed mechanism shown in Fig. 7 as viewed from line 9—9 of Fig. 8.

Referring firstly to Figs. 1 to 6, of the drawings, in which like reference characters indicate corresponding parts in the several views, the reference character 10 indicates generally manually operable metal fusing apparatus exemplified herein as a soldering gun of any suitable type which as an example may be of the structure illustrated and described in Letters Patent to Anton, No. 2,680,187, dated June 1, 1954, in which a pistol type hand-grip 11 has an electrical connection 12 and a fingerpress switch 13 at the front face of the hand-grip to open and close an electric circuit to a transformer 14, primary coil 15 and an elongated secondary coil 16 which is U-shaped with substantially parallel elongated legs 17, the latter extending sufficiently forwardly to provide the equivalent of the elongated barrel portion of a gun of the pistol type, in which the handgrip is disposed substantially normal to the barrel, the barrel having at the forward end of said barrel a looped resistance element 18 which, because of variation of size or character of its component metal provides at the terminal end of the loop a heating or soldering tip or point 19, said tip, upon energizing of the coils, being sufficiently heated almost instantly for fluxing an adjacent end portion of a soldering wire or strip fed by the feed means, as will be described.

The feed means as herein exemplified comprises an assembly of its constituent structural parts preferably as a unitary assembly mounted below the elongated barrel portion 17 of the gun on a bracket support member generally indicated 20, having a front wall 21, relatively spaced side walls 22 and 23, which are relatively opposed and extend perpendicularly rearwardly from the front wall, and being open at its rear. At the rearward free edge of the side walls are ears 24 providing relatively spaced aligned openings 25 through which a suitable bolt 26 may be passed for securing the bracket and feed means to the housing of the hand-grip portion 11. The front wall 21 of the bracket has tightly secured therein, preferably substantially centrally thereof, one open rearward feed end of a guide or feed tube 27 which seats snugly upon a flanged tubular nipple 28, both being held in the bracket by a clamp support member 29, said feed tube extending forwardly substantially parallel with and spaced from the barrel portion 17 of the gun. The opposite forward discharge end of the feed tube is crimped inwardly as at 30 to slidably engage a tubular extension tip member 31, the free terminal end portion of the tip being adjacently spaced from heating tip 19 and turned arcuately at 32 whereby a strip of fusible metal such as solder wire 33 may be guided thereby to the heated tip 19 of the gun, the slidability of the tip providing for lengthwise and rotative adjustment for placing the said metal strip more accurately relative to the heating point 19.

Means are provided for propelling the solder wire through the tube. It is to be observed that the feed tube has a substantially rectangular elongated opening or window 35 in its side wall centrally of its length, said opening having a forward transverse edge wall 36 which is closed. At the opposite or rearward end the window opening communicates with a relatively narrow slot 37 which extends rearwardly to the end of the feed tube for slidably receiving a shoe member to be further described.

The mechanism for propelling the wire strip comprises trigger mechanism generally indicated 40 and pusher mechanism generally indicated 41.

The trigger 40 is pivotally mounted on the inner face of side wall 22 of bracket 30 by means of a pivot pin 42, and has a depending finger-press trigger portion 43 having a finger-grip part 43a below pivot 42, which is disposed in adjacently spaced relation along the front face of the handgrip 11 and finger-switch 13 so that it may be manipulated by the same hand that supports the handgrip of the gun, the said mounting of the trigger on the side wall thus spacing the finger-grip part 43a slightly offset laterally to one side of the electric switch as shown by the broken lines of the trigger in Fig. 1. The trigger has a lever portion 44 which extends upwardly from the pivot pin and is tensioned rearwardly toward the body housing of the gun by a coil spring 45 connected between a pin 46 of said lever portion and a stud 47 mounted on the inner face of side wall 22, and, if desired, said stud may also serve as a stop means for rearward movement of the lever portion 44, the forward movement of trigger lever being stopped by front bracket wall 21. At its upper edge portion the lever is bifurcated by a fork 48, providing a crotch which will be referred to hereafter.

Referring again to the side wall 22, it will be noted that it is provided with an elongated guide slot 49 which is codirectional with the feed tube, and that the orbit of the closed end of the crotch of fork 48 moves across the inner face of side wall 22 and slot 49, in which environment the pusher means 41 may be described.

The pusher means includes a bar or rod 50 externally of and substantially parallel with the feed tube 27 and opening 35, the rod being slidably mounted through the front plate 21 of bracket 20 and through the clamp support 29, a free rear end portion of the pusher bar being turned upon itself substantially perpendicularly and having a terminal end 51 slidably engaged in slot 49 for reciprocation therein by manipulation of trigger 40, it being noted that the orbit of movement of the trigger fork is limited by the length of the slot 49. At its opposite end the pusher rod pivotally mounts a pawl member 52 by means of a pivot pin 53, the pawl having a tooth 54 turned angularly normally to the pusher rod, and being in substantially the horizontal plane of the axis of tube 27. The pawl reciprocates in alignment with the pusher rod and pivots perpendicularly thereto. The length of the pusher rod is such that the range of reciprocation of the pawl and tooth is in confronting opposed relation to the length of opening 35 in the side wall of tube 27 so that the tooth may readily enter said opening, such movement of the pawl stopping short of the end wall 36 to prevent possible jamming of the pawl.

Means are provided for swinging the pawl on its pivot mounting 53 whereby the tooth swings through said opening 35 to engage the solder wire 33 in the tube 27, such means comprising a relatively short slide member such as a tubular sleeve 55 slidable in the tube 27, and through which the solder wire is fed, the slide member or sleeve having an opening 56 therein which underlies the opening 35 of the feed tube. The sleeve is longitudinally slotted at its forward end, as at 55a and may thus be provided with a degree of frictional resistance to freely slide in the feed tube. Adjacent to the rear end of the sleeve opening 56, the sleeve has a radially extended flanged shoe 57 which slides in, and is guided by, slot 37 rearwardly of the opening 35, the pawl 52 being pivotally fulcrumed on the shoe by a pivot pin 58 which is spaced offset from the pivot pin 53, so that when the sleeve reciprocates with the pawl and pusher rod the frictional drag of the sleeve causes the pawl firstly to turn on pivot 53 and fulcrum on pin 58 whereby the tooth 54 is pushed simultaneously through the openings 35 and 56 into engagement with the solder wire at the beginning of the forward movement of the rod, the further forward movement of the pusher rod and pawl thus pushing the pawl-engaged solder wire forwardly through the tube 27 whereby its outer free end is advanced through tubes 27, 31, into fluxing proximity to the heating tip 19. The forward movement of the pawl and the engaged solder strip is limited both by the closed forward end of slot 49 and by the stopped movement of the trigger. Vertical adjustment of the tube 27, and thereby the feed tip 31, is regulated relative to the heating point 19 by an adjustable stop member 59 which may pivot on trigger pin 42 and be releasably tightened thereon by a suitable nut on the inner end of the pin 42, the member 59 having a flange which bears against the housing 11 to stabilize a desired tilt of the entire bracket assembly vertically and hold it at that position on the bolt 26, and by such tilting adjust the free feed end of tip 31 vertically relative to the heating point member.

Normally it may be expected that when the solder strip is pushed through the arcuate forward open end portion of tube 27 it will not rebound rearwardly because of its voluntary resistance to free bending. However, it may have irregularities which could interfere with sliding of sleeve 55, or since it may happen that in operation the solder strip may be pushed against a work piece, it is preferred to provide a suitable means to resist unintended rearward movement thereof, such means being exemplified herein as a forwardly inclined spring finger member 60 engaged between the nipple 28 and rear end of tube 27, its forward or free end having tensioned contact upon the solder strip.

Since it is desirable to have a supply of solder wire carried by or mounted adjacent to the feed means for continual operation, reservoir means are provided for holding a supply of such wire. The side wall 23 of bracket 20 has an opening 65 therethrough, and at the top and bottom of said opening there are outwardly extended relatively parallel flange plates 66, 67 having a degree of resistant resilience. Between the opposed faces of said plates there may be removably and replaceably mounted a reservoir supply spool 68 of solder wire. The spool may rotate on a suitable axial spindle 69 having its opposite ends fitting into holes 70 of the flange plates. Thus the wire may be continuously fed from the spool through opening 65 to and through the tube 27 and, intermittently as desired, to the heated tip 19 of the resistance element, responsive to the pusher means and pawl, and the manual operation of the trigger, the latter being so positioned that it may be operated by fingers of the same hand that supports the gun or fusing apparatus and operates the electrical switch 13 for heating the tip 19 of the resistance element.

In Figs. 7 to 9 the invention is shown in a modified form adapted to a well-known type of aligned soldering iron, in which the respective parts operate in the same way and for the same respective purposes as heretofore described. The hand grip 80, electrical circuit 81, finger switch 82 and soldering tip 83 are conventional. The supporting bracket for the feed mechanism is indicated generally 84, the trigger 85 is pivotally mounted on one side wall and its finger-press portion 86 is adjacent to the handgrip. The side wall 87 of the bracket has a slot 88, and the feed tube is indicated 89 being provided with its adjustable extension 90.

The opening in the side wall of the tube 89 is indicated 91, pusher rod 92, pawl 93 and its two pivots respectively 94 and 95, teeth of the pawl being indicated 96, the slide member 97 and its shoe 98. The reservoir spool of solder wire 99 is resiliently and releasably mounted on the other side wall of bracket 84 rearwardly of the tube 89 and feeds substantially in alignment therewith. The means to resist the unintentional reverse recoil of the wire is provided within the bracket at the rearward or mounted end of the tube 89 and comprises a pair of resilient fingers 100 having at the respective free ends retroverted hook portions 101 which are relatively opposed and sufficiently spaced to permit the wire to slide forward without resistance, the hooks bearing on the wire sufficiently so that the edges of the hooks resist a rearward movement of the wire. Mounting means to the handgrip is indicated by clamp 102.

The mode of operation may be described by reference to Figs. 1 to 5 inclusive. It is to be assumed that a strip of fusible metal has initially been manually fed from spool 68 through tube 27 including sleeve 55. Having operated the finger switch 13 to heat point 19, the trigger finger-grip portion 43 is pressed toward the hand-grip which manifestly moves the lever and fork portion 48 in an orbit across the slot 49. The pusher rod, having an end riding in the fork and slot, is thus moved forwardly and thereby tips the pawl 52 on pivots 53, 58 until the tooth 54 passes through openings 35 and 56, and bites into the fusible strip 33. Since the pawl may be pushed no more pivotally, the further pressure by the trigger and pusher rod causes the pawl to slide forward and carry with it the internal slidable tubular sleeve 55 which carries the shoe 57 and pivot 58 on which the pawl is mounted. This forward movement carries the pawl, sleeve and metal strip forward, the forward movement being limited by the forward excursion of the pusher rod in slot 49 and being sufficient to feed a predetermined amount of the solder strip into substantial contact with the heating point 19, with relation to which the discharge end of the feed tube 27 and extension 31 shall have been properly adjusted. It will be observed that the pressure of the pawl on the wire strip does not press the strip into direct contact with the internal wall of tube 27, but rather into contact with the slidable sleeve 55 so that when pressure is on the strip it rides forwardly with the sleeve and slides loosely in the remainder of the tubes 27, 31.

Upon release of trigger pressure the spring 45 retracts the fork 48 and pusher rod 50, thus raising the tooth free of the feed tube and wire and retracting the pawl and sleeve for repeat operation, the spring finger 60 preventing a retraction of the solder strip.

The reservoir spool 68 being rotatable on its spindle 69 needs no other means than tensile pulling to feed the wire strip from the spool, and a renewed spool of wire may be inserted when needed by resilient snap-out and snap-in action of the spool spindle due to the resilience of the supporting plates 66, 67.

Having described the invention, I claim:

1. A feed mechanism for a strip of fusible metal in manually operable fusible apparatus which has a handgrip including an electrical operating switch, and an elongated electric heating means extending therefrom and provided with a heating point member spaced from the handgrip, said feed mechanism comprising an elongated fixedly mounted feed tube externally parallel to the elongated heating means and having a rearward feed end mounted adjacent to the handgrip and extending therefrom to a position adjacent to said heating point, the feed tube being adapted for slidably receiving therethrough a strip of fusible metal, said feed tube having an elongated opening in its side wall intermediate its ends, a spool-holding bracket means spaced adjacently to said feed end of the tube adapted for releasably holding a reservoir supply spool of said fusible metal strip, and means for intermittently advancing said metal strip in the feed tube comprising a trigger member mounted adjacent to the handgrip, a reciprocable pusher rod substantially parallel with and externally of the feed tube and being engaged at one of its ends for reciprocation by said trigger, a toothed pawl mounted in relative alignment at the opposite end of the pusher rod and reciprocable in alignment therewith, a slidable member within the feed tube underlying said side wall opening, the slidable member being adapted for receiving the metal strip thereagainst, the said pawl having a pair of relatively spaced pivotal mountings comprising a first pivotal mounting to the pusher rod and a second pivotal mounting to said slidable member for unison reciprocation of the pawl with the slidable member and the pusher rod, the pawl having a fulcrum on said second pivotal mounting whereby the toothed portion of the pawl may be selectively moved by the reciprocation of the pusher rod into and out of said opening in the feed tube for respectively engaging and disengaging the fusible strip in the feed tube upon reciprocation of the pusher rod by the trigger.

2. A device of the character described as set forth in claim 1 and in which the spool-holding means includes means for resiliently holding the spool at its opposite axial ends in the bracket whereby the spool may be selectively removed and replaced by resilient snap-in and snap-out action.

3. A feed mechanism of the character described as set forth in claim 1, the said feed tube having an axially extended elongated slot therein communicating with one end of said opening in the side wall of the feed tube, and said slidable member in the feed tube having a radially extended shoe slidable in said slot, the pawl having its said second pivotal fulcrum mounting connected to said shoe.

4. A feed mechanism for feeding a strip of fusible metal to a heating point of a manually operable fusing device for a metal strip, comprising a unitary assembly of a bracket having means for detachable mounting to a manually operable fusing device, the bracket including a front wall having at its opposite ends rearwardly extending relatively spaced side walls which are relatively opposed, a stationary continuous feed tube having a feed end mounted in said front wall and adapted for slidably receiving therethrough a strip of fusible metal, said feed tube having an elongated opening in its side wall intermediate its ends, a spring-tensioned trigger pivotally mounted on one of the side walls, a resilient spool-holding means mounted on the other side wall and adapted for releasably holding a reservoir supply spool of fusible metal strip, means operated by said trigger for advancing the metal strip in the feed tube comprising a pusher rod slidably supported through said front wall and extending externally of and substantially parallel with the feed tube and having one end connected to the trigger for reciprocation thereby, a pawl having a toothed portion, said pawl being pivotally mounted in relative alignment at the opposite end of the pusher rod, a slidable member in the feed tube underlying said sidewall opening for receiving thereagainst a strip of fusible metal in the feed tube, the pusher rod, pawl and slidable member being connected for unison reciprocation, said pawl being actuated by the reciprocation of the pusher rod in one direction for turning said pawl on said pivotal mounting whereby its toothed portion may be moved into said side wall opening of the feed tube for engaging the fusible strip in the feed tube and pressing it against the slidable member for advancing said strip in the feed tube, and said pawl disengaging said metal strip and being moved on its pivotal mounting out of the sidewall opening by movement of the pusher rod in the opposite direction responsive to the spring actuation of the trigger.

5. Bracket supported means for feeding a strip of fusible metal in a manually operable heating device as set forth in claim 4, and in which the pawl has a first pivotal mounting connecting it to the pusher rod and a second pivotal mounting to said slidable member on which the pawl pivotally fulcrums responsive to its movement by the pusher rod for turning the toothed portion of the pawl, respectively, into and out of said opening in the sidewall of the feed tube.

6. A feed mechanism for a strip of fusible metal as set forth in claim 4, the reservoir supply spool-holding means having relatively spaced resilient plates adapted for resiliently receiving therebetween the opposite axial ends of a reservoir supply spool of the fusible metal strip.

7. Means for feeding a strip of fusible metal in a manually operable fusing device as set forth in claim 5, the sidewall opening of the feed tube having a slot extending from one end thereof toward the front wall of the bracket, and said slidable member having a radially extended shoe slidable in said slot, and the said second pivotal fulcrum mounting of the pawl being connected to said shoe whereby the slide member has connection to the pusher rod through the pawl for unison reciprocation with the said rod and pawl.

References Cited in the file of this patent

UNITED STATES PATENTS

| | | |
|---|---|---|
| 2,093,527 | Petti | Sept. 21, 1937 |
| 2,254,521 | Gardner | Sept. 2, 1941 |
| 2,303,947 | Moore | Dec. 1, 1942 |
| 2,466,056 | Smoke | Apr. 5, 1949 |
| 2,604,064 | Sefton | July 22, 1952 |
| 2,643,321 | Greene | June 23, 1953 |
| 2,797,293 | Weber | June 25, 1957 |